United States Patent [19]

Williams et al.

[11] 4,142,550
[45] Mar. 6, 1979

[54] PRESSURE REGULATING VALVE

[75] Inventors: Michael R. Williams; Dean T. McDonald, both of Jonesboro, Ark.

[73] Assignee: FMC Corporation, San Jose, Calif.

[21] Appl. No.: 805,756

[22] Filed: Jun. 13, 1977

[51] Int. Cl.[2] ............................................. F16K 15/00
[52] U.S. Cl. ..................................... 137/538; 137/542
[58] Field of Search ................ 137/469, 538, 540, 542

[56] References Cited

U.S. PATENT DOCUMENTS

| | | | |
|---|---|---|---|
| 2,021,771 | 11/1935 | Farmer | 137/540 X |
| 2,568,026 | 9/1951 | Pigott | 137/469 |
| 2,874,718 | 2/1959 | Kelly | 137/469 |
| 3,006,364 | 10/1961 | Osborn | 137/538 |
| 3,168,108 | 2/1965 | Patrick | 137/542 |

FOREIGN PATENT DOCUMENTS 647,614  12/1950  United Kingdom ..................... 137/469

*Primary Examiner*—Harold W. Weakley
*Attorney, Agent, or Firm*—R. S. Kelly; T. J. McNaughton

[57] ABSTRACT

A pressure regulating valve is disclosed as including a valve seat having a flat working surface and a central inlet bore extending perpendicularly from the flat working surface through the seat. A valve disc having a flat circular working surface, the diameter of which is at least three times as large as the diameter of the inlet bore, is positioned against the seat in a coaxial relationship with the inlet bore to provide a large annular area of contact with the flat seat surface. The disc is biased toward the seat by an assembly including a spring within a spring housing, a piston, reciprocally engaged in the innermost end of the spring housing, and a ball bearing received in opposed recesses in the seat and disc. When subjected to high pressure bypass flow through the valve seat inlet bore, the disc is forced from the seat and attains a stable, parallel orientation relative to the seat under the influence of the bypass flow. Within the wide annular flow passageway between the disc and seat, the bypass fluid undergoes a controlled and substantial reduction in velocity before discharging from the annular exit of such passageway, thereby minimizing errosive wear of the valve part which surrounds the annular exit.

2 Claims, 1 Drawing Figure

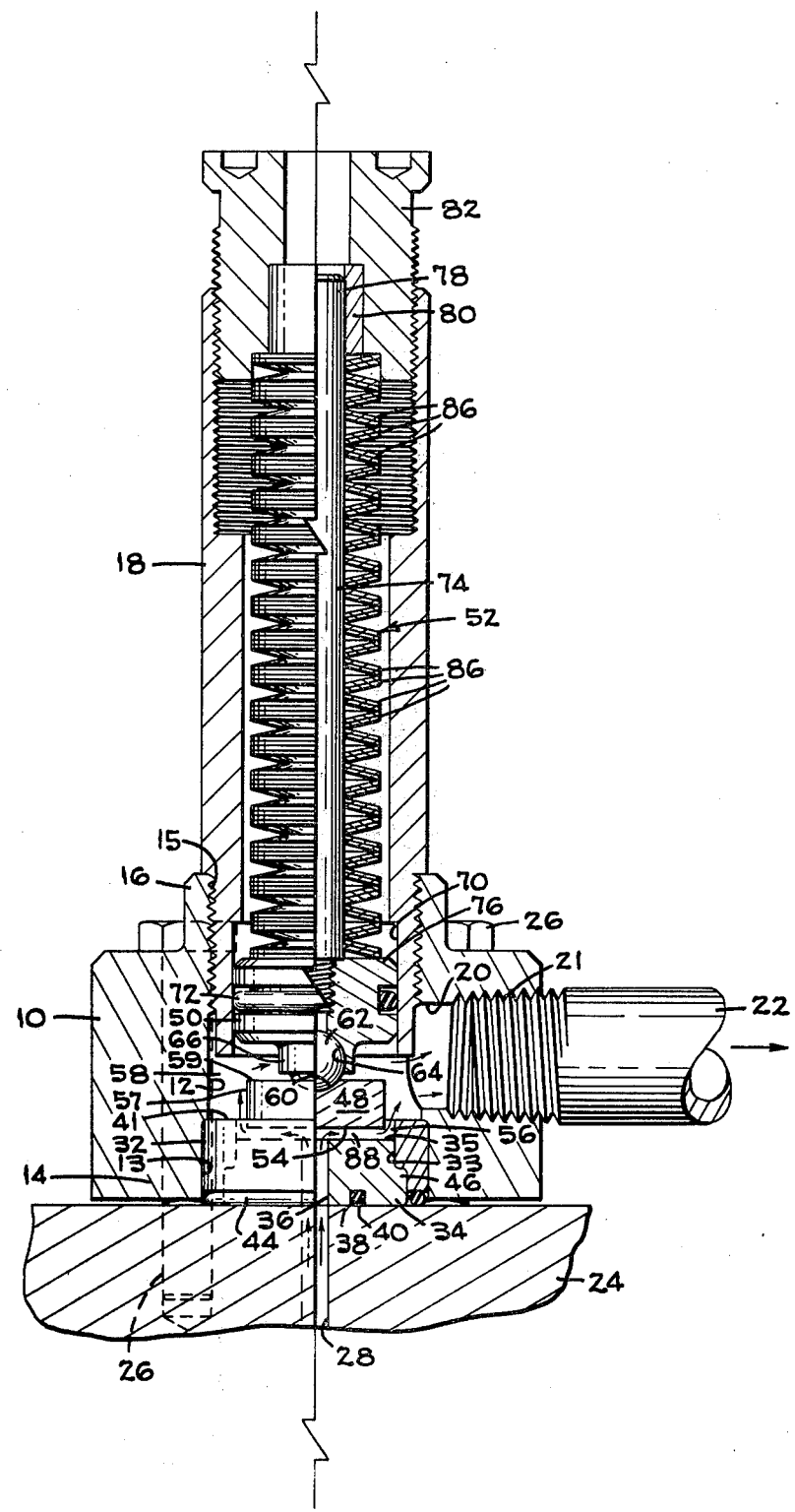

PRESSURE REGULATING VALVE

BACKGROUND OF THE INVENTION

1. Field of the Invention

The present invention generally relates to valves, and more particularly concerns pressure regulating valves which are applicable for use at high to very high pressures, such as 1,000 to 10,000 p.s.i.g.

2. Description of the Prior Art

Conventional high pressure spray systems utilize a positive displacement, reciprocating pump and a spray nozzle which has a fixed discharge opening. The desired system pressure is adjusted by controlling flow rate to the nozzle. As the nozzle opening enlarges due to erosion under the influence of the high velocity discharge stream, the flow rate from the pump must be regulated to compensate for the system pressure loss resulting from such wear.

The control of the volume of flow directed to the spray nozzle may be satisfactorily accomplished by providing the pump with a variable speed drive unit. However, variable speed drives are very expensive, especially in the size required to maintain a system pressure of, for example, 10,000 p.s.i.g.

In lieu of a variable speed drive, it is common practice in the spray system field to employ an adjustable pressure regulating valve connected to a valve chamber for bypassing a portion of the discharge flow from the pump. The adjustable valve employs a spring for yieldably biasing the plug thereof against the seat, and the system pressure is controlled by adjusting the tension of the spring. As the spring tension is increased, the flow rate of the bypass flow is decreased, thereby increasing the flow rate from the valve chamber to the spray nozzle and thus the system pressure. As the spray nozzle wears, the associated drop in the system pressure of the valve may be negated by increasing the tension of the spring to thus bypass less flow through the pressure regulating valve.

When operating at very high system pressures, for example, at 10,000 p.s.i.g., the bypass flow is accelerated to very high velocities between the separated mating surfaces of valve plug and valve seat. In known conventional high pressure relief valves, such as disclosed in U.S. Pat. No. 3,087,510 to Normand, the mating surfaces of the seat and plug are tapered annular surfaces which are narrow to insure a fluid-tight seal therebetween. Due to manufacturing tolerances relating to the accuracy of the roundness and taper of the mating surfaces and also to the accuracy of the positioning of the plug in coaxial alignment with seat, the width of the annular surfaces cannot be substantially increased without reducing the effectiveness of the seal. At very high system pressures, even slight misalignment, or roundness, or taper errors can lead to rapid localized erosion of the plug and seat which is ruinous to the pressure regulating characteristics of the valve.

When such erosion occurs in these prior art valves, it is normally necessary to replace both the seat and the plug. Replacement of both is required because the mating surfaces of the two components are customarily lapped together to provide them with the required degree of accuracy of roundness and taper.

Another problem associated with prior known pressure regulating valves used in high pressure systems is the problem of the erosive wear on the parts surrounding the annular exit of the passageway formed between the mating surfaces of the valve seat and plug. Due to the narrowness of the annular passageway, the bypass fluid does not substantially decelerate in the passageway and therefore discharges at very high velocities from the annular exit of the passageway. In the aforementioned tapered plug valve, the bypass flow egresses through an exit bore formed in the valve seat. A cutting stream is produced by egressing liquid which erodes areas of the valve seat bore immediately downstream from the tapered mating surface of valve seat bore, and especially at the side of the bore opposing the main flow of fluid through the valve.

In another sort of pressure regulating valve, the inlet bore is formed through the valve seat and the bypass flow first impinges on the bottom surface of the plug and then flows radially outwardly through an annular passageway between annular mating surfaces of the separated seat and plug. Examples of this general type of valve are shown and described in United States Pat. Nos. 2,568,026 to Pigott; 2,622,613 to McNeal; 2,880,751 to Tobis et al; 2,277,656 to Falls; and 1,949,150 to Eplett. In all of these prior art patents, the seats of the disclosed valves are comparatively narrow. The aforenoted Pigott patent cites a reason for the narrowness of the annular surfaces--to minimize the static pressure exerted by the bypass stream on the plug as the plug begins to separate from the seat and to thus provide more stable operations under various pressure and flow conditions. The narrow annular passageway of each of these prior art valves will not both throttle the bypass stream and reduce under controlled conditions the high velocity of the fluid developed in such narrow passageway; thus, the stream will discharge from the narrow passageway at a high velocity and relatively quickly erode the surrounding parts of the valve.

SUMMARY OF THE INVENTION

The primary object of the present invention is to provide a pressure regulating valve suitable for use at high or very high system pressures which substantially eliminates the aforementioned problems associated with known prior art pressure regulating valves.

The pressure regulating valve of the present invention includes a valve body enclosing a chamber and having an outlet passageway extending from the chamber, a valve seat having a flat working surface and an inlet bore extending perpendicularly through the seat member from the flat working surface, and a valve disc having a flat circular working surface maintained in a generally concentric relationship with respect to the inlet bore and in a parallel relationship with respect to the flat working surface of the seat. The diameter of the disc surface is at least three times greater than that of the inlet bore to thereby provide a wide annular passageway between the seat and the disc. Bypass flow accelerates at the annular inlet to the passageway and thereafter decelerates in a gradual, uniform manner to achieve a low velocity at the annular exit of the passageway, whereby the bypass flow discharging from the passageway will cause minimal erosion of the surrounding valve parts.

In a preferred embodiment of the valve of the present invention, the disc is maintained in a concentric and parallel relationship with respect to the seat by an assembly comprising a spring housing, a piston reciprocably engaged in the spring housing, a spring within the housing acting on the piston to urge it toward the disc, and a ball engaged in recesses formed coaxially in the bottom surface of the piston and the top surface of the valve disc. When subjected to high pressure bypass flow, the disc will swivel about the ball and assume a parallel relationship with respect to the working surface of the seat under the influence of the pressure exerted by the high pressure bypass flow on the flat circular working surface of the disc.

BRIEF DESCRIPTION OF THE DRAWING

The FIGURE shown in the accompanying drawing is an elevational view, partially in section, of a preferred embodiment of the high pressure regulating valve of the present invention.

DESCRIPTION OF A PREFERRED EMBODIMENT

As illustrated in the drawing, a pressure regulating valve assembly designed for operation at very high system pressures, for example up to 10,000 p.s.i.g., comprises a main housing 10 having a longitudinal bore 12 which has a counterbore 13 formed at one end 14 thereof and threads 15 formed at the other end 16 thereof. A tubular casing 18 is engaged with the threads 15. An outlet bore 20 extends radially from the main housing bore 12 and is provided with threads 21 at its outer end for receiving a bypass conduit 22 which leads to the intake port of a pump (not shown).

The housing 10 is secured by a plurality of bolts 26 to the housing 24 of a valve chamber of a pump (only a fragment thereof being shown) such that the housing bore 12 is coaxially aligned with the bypass bore 28 of the valve chamber of the pump. An annular member 32 is engaged in the counterbore 13 of the housing bore 12, and a generally cylindrical valve seat member 34 having an axial inlet bore 36 extending therethrough is engaged within a bore 33 formed in the annular member 32. Thus, when the valve is assembled, the valve seat inlet bore 36 and the pump chamber bypass bore 28 register with each other. The valve seat member 34 has a flat surface 35 at the upper end thereof which is normal to the inlet bore 36.

An elastomeric sealing ring 38 is engaged in an annular groove 40 which is concentrically formed in the bottom surface of the seat member 34 and forms a first high pressure seal between the seat member and the valve chamber housing 24. The periphery of the upper surface 41 of the annular member 32 is engaged against the inner shoulder of the counterbore 13, and the member 32 is of a length such that the annular lower surface thereof is spaced from the opposing surface of the valve chamber housing 24. Thus, an annular space is formed between the side wall of the counterbore 13, the adjacent side wall of the valve seat member 34, the lower surface of the annular member 32, and the upper surface of the housing 24. Another elastomeric sealing ring 44 is received in such annular space and forms a secondary fluid-tight seal between the valve chamber housing 24 and the valve housing 10.

It will be noted that the annular member 32 is counterbored at its lower end to receive a complementary cylindrical shoulder 46 formed at the bottom of the valve seat member 34. The complementary side wall surfaces of the annular member 32 and the valve seat member 34 function to align the valve seat member within the main bore 12 of the housing and also to compress the sealing rings 38 and 44 in their respective annular spaces.

A valve disc 48 is biased against the upper surface 35 of the valve seat 34 by a piston 50 which is acted upon by a vertically extending spring 52. The disc has a cylindrical shape having a flat circular bottom surface 54, the diameter of which is at least three times greater than the diameter of the valve seat bore 36. By way of example, a ratio of disc diameter to inlet diameter of 5 to 1 was chosen for operating at a system pressure of 10,000 p.s.i.g.; the inlet bore was 3/16 inches in diameter, and the diameter of the disc was 15/16 inches. The diameter of the bore 33 of the annular member 32 is greater than the outer diameter of the disc 48 to thereby provide a short, longitudinally extending, annular passageway 56 which surrounds the cylindrical side wall 57 of the disc and which leads from the interface between the disc and valve seat to a chamber 58 formed within the bore 12 of the housing 10. In the pressure regulating valve herein described the disc diameter is 15/16 inches and the diameter of the bore 33 of the annular member 32 is 1 1/16 inches thereby providing an annular passageway 56 which is 1/16 inches wide.

The disc 48 has a flat top surface 59 having a spherical recess 60 formed centrally therein for receiving a ball 62. A spherical recess 64 is formed in a socket 66 which extends from the center of the lower end of the piston 50 with the upper end of the ball 62 being engaged within such socket recess. The depths of the opposed recesses 60 and 64 are adapted to provide sufficient spacing between the lower end of the socket 66 and the top surface 59 of the disc to permit the disc to swivel freely about the vertical axis of the ball 62.

The piston 50 reciprocates within a smooth counterbore 70 formed in the lower end of the tubular casing 18. The counterbore 70 is coaxial with the inlet bore 36; thus, the piston 50, the ball 62, and the disc 48 will all reciprocate along an axis which is coaxial with the inlet bore 36. The piston has a circumferential groove formed thereabout, and an elastomeric ring 72 is received in the groove to form a low friction, low pressure seal between the piston and the wall of the counterbore 70. A stem 74 is threadably received in the upper end 76 of the piston so that it will extend upwardly through the spring 52. The upper end 78 of the stem 74 is slidably received within the bore of a tubular bushing 80 mounted within the bore of a nut 82. The nut is threadably engaged within the end of a bore at the top end of the casing 18. The spring 52 consists of a stack of Belleville washers 86 compressed between the upper end 76 of the piston and the lower end of the nut 82. It will, of course, be understood that the amount of pressure exerted by the spring 52 on the piston, and thus on the disc 48, will be dependent upon the vertical adjustment of the nut 82. Accordingly, the desired system pressure at which the valve assembly will permit bypass flow is set by such adjustment.

When the pressure of the fluid within the valve seat inlet bore 36 exceeds the desired system pressure, the valve disc 48 will lift from the valve seat 34 and provide an annular passageway 88 between the flat top surface 35 of the seat and the opposed flat bottom surface 54 of the disc. The passageway 88 is relatively long (because of the widths of the valve seat and the disc) with respect to the disc-seat passageways of known prior art pressure regulating valves. Due to the length of the passageway, a large annular decelerating region is formed between its annular inlet at the mouth of bore 36 and its annular exit, such exit being situated immediately below the sidewall 57 of the valve disc. In the decelerating region, the cross-sectional fluidflow area increases radially in a gradual, controlled manner. Accordingly, when operating at very high fluid pressures, the high velocity fluid flow created at the throttling area adjacent the bore 36 is substantially decelerated in a gradual and controlled manner before its discharge at the upper end 41 of the annular member 32.

In the aforedescribed valve wherein the disc has an outer diameter five times greater than the diameter of the inlet bore 36, the cross-sectional fluid flow area between the disc and the seat increases in a linear manner from the inlet to the outlet of the flow passage, with the cross-sectional area at the outlet being five times larger than the cross-sectional area at the inlet to the passage. A substantial amount of the total hydrokinetic energy of the fluid flowing from the inlet bore 36 is converted into heat by impingement against the opposed flat surfaces 35 and 54 (defining the passageway 88) as the flow is throttled at the annular inner portion of the passageway 88 and thereafter decelerated. The wide annular contact area between the seat and disc causes the fluid flow to exit from the passageway 88 at a substantially reduced velocity, thereby minimizing the erosion due to the impact of the exit flow from the passageway 88 against the surrounding annular member 32. As a further benefit, the fluid which exits radially outwardly from the passageway 88 into the passageway 56 will be seen to impinge upon a relatively large impact area on the annular member 32.

Another aspect of the high pressure valve of the present invention is that the disc 48 is aligned relative to the valve seat 34 by the pressure of the bypass flow. The disc is free to swivel about the ball 62 within the wide limits imposed by the spacing of the socket 66 of the piston 50 and the top surface 59 of the disc. The ball is maintained in coaxial relationship with the inlet bore 36 by its engagement in the socket recess 64, thereby maintaining the bottom surface 54 of the disc in a concentric position relative to the inlet bore 36. The bottom surface of the disc is maintained in a parallel orientation relative to the flat upper surface 35 of the seat under the influence of the bypass flow through the passageway 88. If, upon opening the valve, the disc 48 should be slightly skewed relative to the seat, the asymmetrical distribution of fluid pressure under the skewed disc will cause the disc to swivel relative to the seat until the distribution of pressure exerted by the bypass stream on the disc surface 54 is uniform about the center of the disc. Due to the symmetry of the circular bottom surface of the disc about the inlet bore 36, the disc surface 54 will be parallel to the seat surface 35 when the pressure exerted by the fluid on the disc is evenly distributed about the center of the disc surface 54.

Since the hydrokinetic energy of the bypass fluid is substantially reduced within the annular passageway 88, the fluid pressure within the chamber 58 will be relatively low, thereby permitting the seal between the piston 50 and counterbore 70 to be a low friction, low pressure seal. This permits the piston to respond rapidly to changes in pressure and thereby effectively dampen the high frequency pressure pulsations which are commonly associated with high pressure, positive displacement pumps.

Another key advantage of the high pressure valve of the present invention is that the opposed flat surfaces 35 and 54 of the seat and plug, respectively, may be manufactured without lapppng the two parts together in a grinding operation. As previously noted, such lapping operation is required in the manufacturing of the tapered mating surfaces of the prior art high pressure valves to assure that a fluid-tight seal will be maintained between the surfaces. A corollary advantage of the valve of the present invention is that the seat or the disc along may be replaced without replacing both parts simultaneously or lapping the new and old parts together. Also, the annular member 32 may be separately replaced if necessary.

Although the best mode contemplated for carrying out the present invention has been herein shown and described, it will be apparent that modification and variation may be made without departing from what is regarded to be the subject matter of the invention.

What is claimed is:

1. An improved relief valve for bypassing flow from a high pressure flow system so as to maintain the pressure within the flow system at a preselected magnitude including a valve casing having a valve chamber formed therein and an outlet bore extending from said valve chamber, valve seat means removably mounted to said casing and extending into said valve chamber, said valve seat means having an inlet bore formed therethrough and a relatively wide, annular surface contiguous with and surrounding said inlet bore, plug means within said valve chamber having an annular surface portion adapted to mate with the annular surface of said valve seat, and means for biasing said plug means towards the seat means with a preselected spring force so as to form an annular throttling passageway between the annular mating surfaces of said seat means and said plug means, wherein the improvement comprises: said valve seat means including an annular outer element which is removably mounted adjacent said valve casing and a cylindrical inner element removably mounted within said outer element, said inner element having said flat annular surface with the inlet bore extending therethrough perpendicularly from the center of said flat annular surface, the outer element having a cylindrical bore formed therein and being mounted relative to said inner element such that said cylindrical bore projects perpendicularly with respect to the annular surface of the inner element into the valve chamber from adjacent the periphery of said annular surface of the inner element, said mating annular surface portion of said plug means having an outer diameter which is substantially greater than the diameter of the inlet bore and which is less than the diameter of said flat annular surface of said inner element thereby forming a broad, radially extending, annular throttling passageway between said flat surfaces of said inner element and said plug means when bypass flow is flowing through said valve chamber, and said cylindrical bore of the outer element of said seat means projecting outwardly from said annular surface of said inner element by a distance which is greater than the thickness of said annular throttling passageway to thereby provide an axially extending, annular passageway between the outer element and said plug means whereby the bypass flow discharged from said radially extending throttling passageway impinges on said cylindrical bore of said outer element and thereafter flows through said axially extending passageway into the valve chamber.

2. The improved valve according to claim 1 wherein said plug means comprises a cylindrical disc, and said biasing means includes a spring casing having a guide bore formed in its end which is proximal the valve chamber, a piston reciprocatably received within the guide bore, and a ball received within recesses which are centrally formed in opposing surfaces of said disc and said piston to thereby permit the disc to swivel within the valve chamber relative to the piston.

* * * * *